United States Patent [19]

Koltuniak et al.

[11] 3,746,967
[45] July 17, 1973

[54] MODULAR POWER SUPPLY CIRCUIT
[75] Inventors: Michael A. Koltuniak, Warren; James B. Rigney, Troy, both of Mich.
[73] Assignee: Controlled Power Corporation, Farmington, Mich.
[22] Filed: Mar. 13, 1972
[21] Appl. No.: 234,205

Related U.S. Application Data
[63] Continuation of Ser. No. 126,994, March 22, 1971, which is a continuation of Ser. No. 9,332, Feb. 6, 1970, abandoned.

[52] U.S. Cl............................ 321/5, 321/19, 321/27
[51] Int. Cl. ............................................. H02m 7/00
[58] Field of Search ...................... 321/5, 8, 19, 18, 321/27, 47

[56] References Cited
UNITED STATES PATENTS

| | | | |
|---|---|---|---|
| 2,563,486 | 8/1951 | Potter ............................... | 321/19 |
| 2,807,771 | 9/1957 | Winograd ......................... | 321/27 X |
| 3,161,820 | 12/1964 | Chumakov.......................... | 323/66 |
| 3,255,403 | 6/1966 | Beaver et al...................... | 323/43.5 |
| 3,383,579 | 5/1968 | Han-Min Hung................. | 321/19 X |
| 3,386,024 | 5/1968 | Koltuniak et al. ................ | 321/19 X |

FOREIGN PATENTS OR APPLICATIONS
129,726   1960   U.S.S.R................................ 321/27

Primary Examiner—William M. Shoop, Jr.
Attorney—Chester L. Davis, Jr.

[57] ABSTRACT

A modular supply for converting three-phase alternating current to direct current for high power applications. A plurality of individual rectifying modules are connected in parallel and fed by a common three-phase SCR controller. The rectified DC output of each of the individual modules are collected in parallel at common output busses. A self-adjusting voltage-current regulator is coupled to the output busses to sample the output current and voltage to control the power passed by the SCR controller. The voltage feedback and current feedback are applied to a "nor" gate which places the SCR controller under the control of the voltage feedback so long as the current does not exceed acceptable limits as determined by the number of modules active in the power supply and/or exceed a current limit that is set by the operator for the power supply. In the voltage control mode, the output voltage is maintained substantially constant. The "nor" gate transfers control of the controller to a current limiting mode which maintains the current within acceptable limits while permitting the voltage to drop off. Each of the modules has an input circuit breaker associated therewith which in turn is arranged to vary the level of the current feedback depending on the number of active modules in the power supply.

15 Claims, 9 Drawing Figures

PATENTED JUL 17 1973  3,746,967

INVENTORS
MICHAEL A. KOLTUNIAK
JAMES B. RIGNEY

BY

Barnes, Kisselle, Raisch & Choate
ATTORNEYS

INVENTORS
MICHAEL A. KOLTUNIAK
JAMES B. RIGNEY

BY

Barnes, Kisselle, Raisch & Choate
ATTORNEYS

MODULAR POWER SUPPLY CIRCUIT

This is a continuation of application Ser. No. 126,994, filed Mar. 22, 1971, which in turn is a continuation of application Ser. No. 9,332, filed Feb. 6, 1970 (now abandoned).

Among the objects of the present invention are to provide an alternating to direct current converter that provides reliability, flexibility, expandability and simplicity for a wide variety of DC power requirements; that provides a novel voltage-current regulator that is self-adjusting to compensate the feedback depending upon the number of active modules in the power supply; and that effectively isolates a failure at an individual module while permitting continued operation of the remaining active modules without materially impairing the voltage-current regulation to thereby prevent a total failure of the power supply.

Other objects, features and advantages of the present invention will become apparent in connection with the following description, the appended claims and the accompanying drawings in which:

Figure 1:
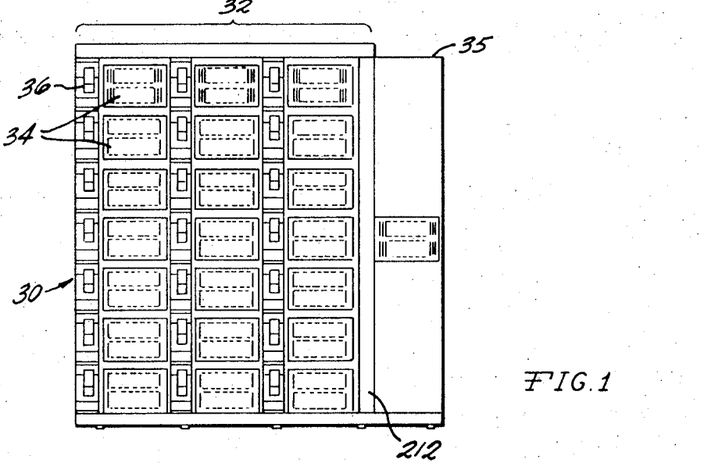
FIG. 1 is a front elevational view of an alternating-to-direct current converter having a modular construction according to the present invention consisting of 21 individual modules.
Figure 2:
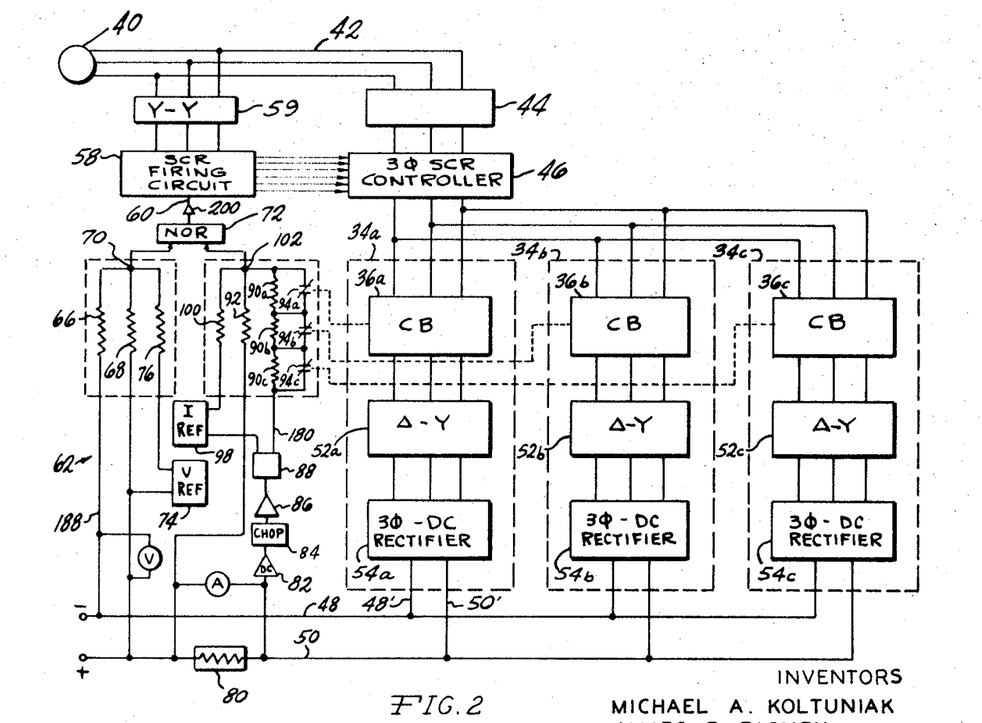
FIG. 2 is a functional block diagram for a modular power supply of the present invention and is illustrated for only three modules for purposes of simplicity.

Referring more particularly to FIG. 1, there is illustrated a modular power supply 30 of the present invention generally comprising a bank 32 of 21 individual rectifying modules 34 and a cabinet 35 which houses the controller circuits for the bank of modules. The 21 modules are arranged in three vertical columns, each column consisting of seven modules. Associated with each module is a separate circuit breaker 36. Each of the individual modules 34 is substantially identical, both in mechanical construction and electrical circuitry. Similarly, for purposes of understanding the present invention utilizing a plurality of modules, supplied from a common input bus and supplying a common output bus, it will be apparent that the operation and construction is basically the same regardless of the number of modules 34 utilized. Hence for purposes of illustration, the functional block diagram of FIG. 2 illustrates a simplified modular power supply incorporating only three modules, designated 34a, 34b and 34c. For purposes of clarity, the corresponding circuit breakers 36a, 36b, 36c are illustrated enclosed in the dashed line indicating an individual module, although it will be understood that the circuit breakers 36 are physically separated from other electrical components in the associated module 34 as will later be described in greater detail.

Referring more particularly to FIG. 2, a three-phase source 40 is connected by lines 42 through a main circuit breaker 44 to a three-phase SCR controller 46. The output of controller 46 is in turn fed via parallel paths through the respective modules 34a–c to the common DC output busses 48, 50. Each of the parallel paths through a respective module 34a, 34b, 34c is through the associated circuit breaker 36 and a delta-to-wye transformer 52 which feeds a three-phase diode rectifying circuit 54. The output from the three rectifying circuits 54 are connected in parallel to the output buses 48, 50.

Controller 46 is a full-wave, duty cycle controller that receives six individual gating signals from an SCR firing circuit 58 which in turn is energized from the three-phase input lines 42. Firing circuit 58 has a control input at 60 that receives a DC feedback control signal from the voltage-current regulation circuit indicated generally at 62. The control signal at 60 controls the angular position of the various gating signals from circuit 58 relative to the phase angles of the positive and negative half cycles in each of the three phases at controller 46. Stated differently, the control signal 60 determines the duty cycle in each of the phases at controller 46 to thereby regulate the power supplies to the modules 34.

In general, the DC control signal at 60 is derived from either a voltage level at busses 48, 50 or the current level at busses 48, 50. More particularly, the voltage across busses 48, 50 is applied through a suitable isolating resistor 66 across a summing resistor 68 to develop the output signal at the summing terminal 70 that forms one input terminal of the "nor" gate 72. A voltage reference from source 74 is also applied through an isolating resistor 76 across summing resistor 68 and in bucking relation to the feedback voltage through resistor 66 such that the output signal developed at the summing terminal 70 has a value indicating whether the reference is greater or less than the feedback from busses 48, 50 in addition to indicating the amount of deviation therebetween. Similarly, the output current in the positive bus 50 is sampled by the shunt 80 and the current feedback signal is fed through a DC amplifier 82, a chopper 84, an output driver amplifier 86 to a rectifier-filter circuit 88 that develops a DC signal representing the magnitude of the current in lines 48, 50. The signal developed by circuit 88 is applied through an isolating resistor 90 across a summing resistor 92. Equal portions 90a, 90b, 90c of resistor 90 are arranged to be shorted by respective contacts 94a, 94b, 94c. Contacts 94a, 94b, 94c are operated by the respective circuit breakers 36a, 36b, 36c so that when the circuit breakers are closed their corresponding contacts 94 are opened. As will later be explained in greater detail, should one of the circuit breakers open, for example, circuit breaker 36a, the corresponding contact 94a will be closed to short out resistor 90a and increase the feedback applied to the summing resistor 92 from the shunt 80. A current reference signal from source 98 is also applied across the summing resistor 92 through an isolating resistor 100 in bucking relation to the current feedback signal from circuit 88 so that the output developed at the summing terminal 102 has an amplitude that indicates which of the two signals exceeds the other as well as the amount of difference between the signals applied across resistor 92. The signal developed at the summing point 102 is applied to the other input of the "nor" gate 72.

Figure 3:
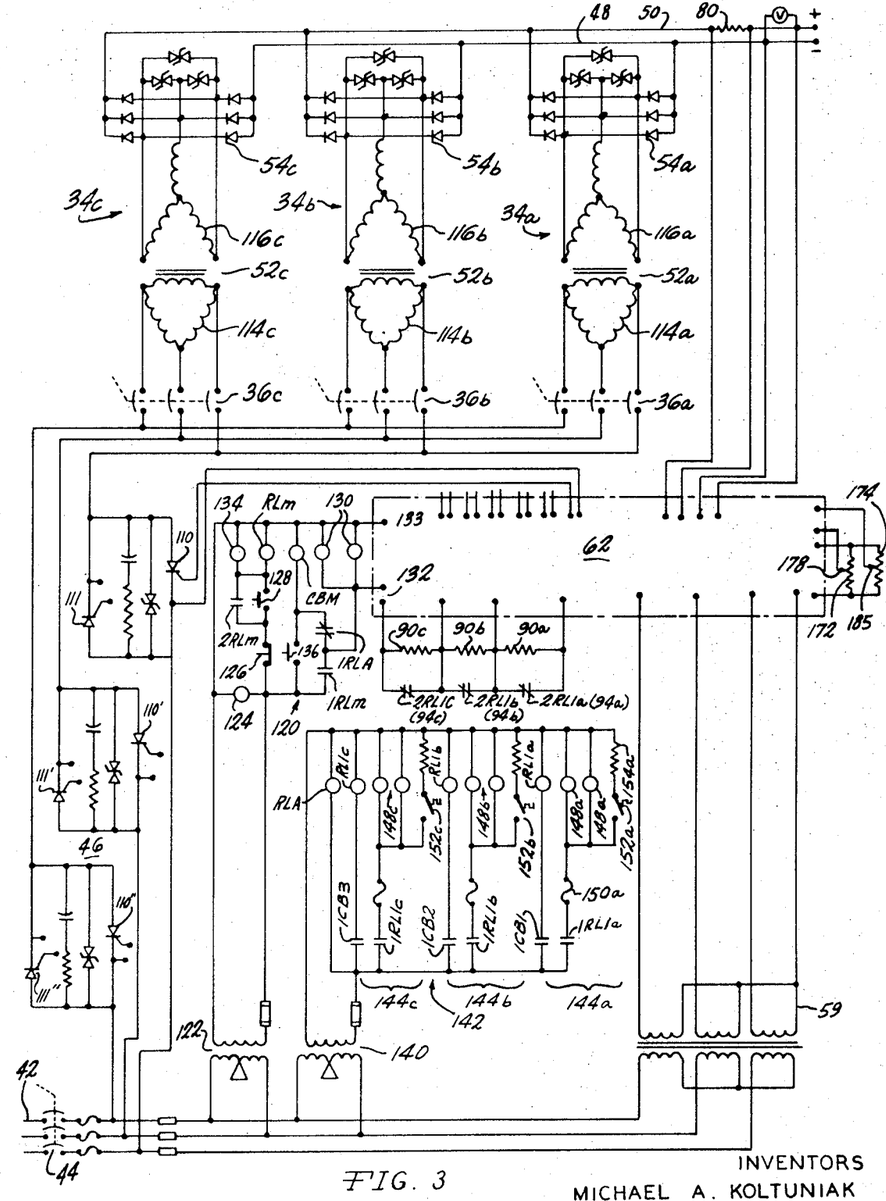
FIG. 3 is a schematic circuit diagram for the main controller-transformer-rectifying circuit paths of the power supply illustrated in FIG. 2.
Figure 4:
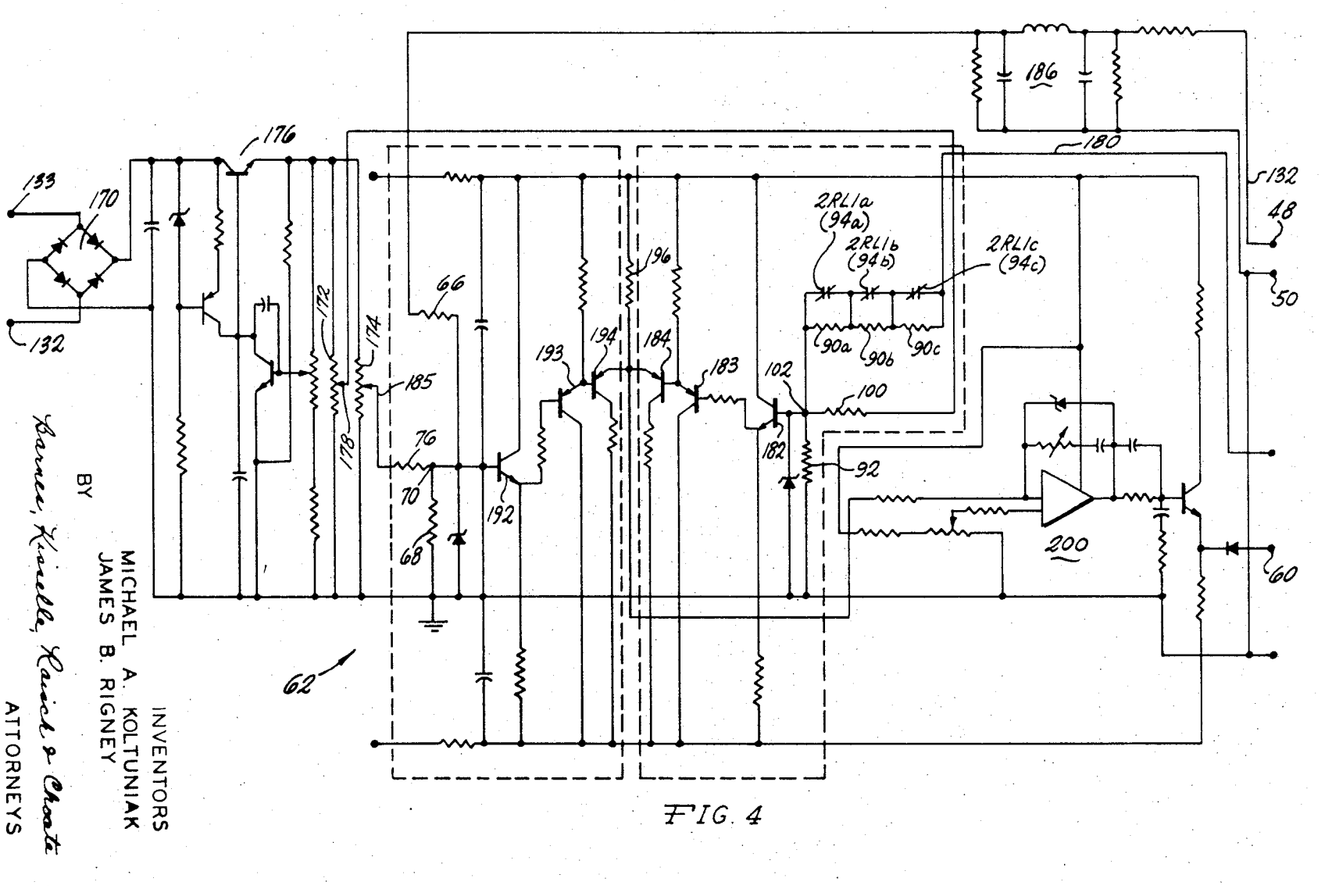
FIG. 4 is a schematic circuit diagram showing the details of a voltage-current regulation circuit of FIGS. 2 and 3.

The circuit details of the SCR controller 46, the modules 34, together with start-stop circuitry and the fan motor circuitry for cooling the modules 34 is shown in greater detail in FIG. 3 whereas the circuit details of the voltage-current regulating circuits 62 are shown in greater detail in FIG. 4. Referring more particularly to FIG. 3, the three-phase lines 42 are fed through the circuit breaker 44 to the SCR controller 46. Each of the three-phase lines is connected to the circuit breakers 36 through a pair of silicon controlled rectifiers 100, 111 for one of the lines, 110', 111' for a second of the lines and 110'', 111'' for the third line. Since the construction and operation of a three-phase, full-wave duty cycle controller is known, per se, for purposes of simplicity only one of the SCR's 110 is shown with its gate circuit connected to the regulating circuit 62. It will be understood that in FIG. 3, the SCR firing circuit 58 (FIG. 2) has been omitted as a separate element and, for purposes of simplicity, included within the regulation circuit 62. Hence as will be apparent, in accordance with one important aspect of the present invention, the controller 46 is effective to simultaneously control the power applied through the respective circuit breakers 36a, 36b, 36c to the primary winding 114a–c of the three transformers 52a–c. It should be noted that transformers 52 have their primaries 114 connected in a delta and their secondaries 116 wye connected in the preferred embodiment. It has been found with the modular circuit being described, a delta-delta transformer and a wye-wye transformer do not operate as effectively for a given physical size due to poorer transformer efficiency. It has also been found that a wye-delta transformer creates phasing problems at the SCR controller 46. The secondaries 116 feed the rectifying circuits 54, each of which consists of six diode rectifiers connected in the three-phase, full-wave bridge circuit illustrated.

The start-stop circuit 120 is fed from one phase of the three-phase input at lines 42 via a control transformer 122 which steps down the 480 volts across the single-phase input to 115 volts for the circuit 120. Connected across the secondary of transformer 122 is a pilot light 124. A control relay RLM is arranged to be connected across the secondary of transformer 122 through a normally closed stop switch 126 and a normally opened start switch 128. Relay RLM has two normally open contacts 1RLM and 2RLM. When start switch 128 is closed to energize relay RLM, the contacts 2RLM close to seal relay RLM and contacts 1RLM close to provide the power for the regulating circuit 62 which includes the SCR firing circuit 58 and for the fan motors 130 that cool the SCR's in the controller 46. For purpose of simplicity, in the present application, a control relay is designated by a letter designation and the contacts operated by that relay will be designated by the same letter designation preceded by a numeral designation. Substantially the same convention will be utilized for identifying solenoids and the contacts associated therewith. A separate pilot light 134 is connected across relay RLM to provide a separate indication that the power to the circuit 62 is on.

A solenoid CBM is also arranged to be connected across the secondary of transformer 122 by an emergency stop switch 136. Solenoid CBM is part of the circuit breaker 44 and is arranged to open the main circuit breaker 44 in response to closure of the emergency stop switch 136.

Two of the main lines 42 also feed a second stepdown control transformer 140 which is arranged to energize the circuit 142 that controls the motors for respective fans in each of the modules 34. Circuit 142 is also arranged to disconnect a module in response to excessive temperatures at the heat sink for the diode rectifiers 54. More particularly, a control relay RLA connected directly across the secondary of transformer 140 has a normally closed contact 1RLA in the circuit 120. When transformer 140 is energized to in turn energize relay RLA, contacts 1RLA open so that a time delayed closing of contacts 1RLM does not cause solenoid CBM to be energized. If, however, the power to circuit 142 is lost, as by a fuse blowing, relay RLA is deenergized and contacts 1RLA close to energize solenoid CBM through the contacts 1RLM that are closed in response to energization of relay RLM. This operates to open the main circuit breaker 44 to disconnect the entire power supply 30 from the lines 42. When the main circuit breaker 44 is opened by the solenoid CBM, either by operation of the emergency stop switch 136 or closure of contacts 1RLA and 1RLM, the power to the power supply 30 can be reconnected only by manual closure of the main circuit breaker 44.

The circuit 142 also includes fan energizing and temperature overload circuits 144a, 144b and 144c for the modules 34a, 34b, 34c, respectively. Since the circuits 144 are substantially identical, an understanding of the construction and operation of these circuits will be apparent from a description of one of the circuits 144a. The circuit 144a includes a control relay RL1a arranged to be connected across the secondary of transformer 140 through a normally opened contact 1CB1 that is mechanically linked with the contacts of the main circuit breaker 36a in the module 34a so that when the contacts in 36a are closed, the contacts 1CB1 are also closed to energize relay RL1a. Relay RL1a has a normally open contact 1RL1a and a normally closed contact 2RL1a (FIG. 3, designated by numeral 94a in FIG. 2). Closure of contact 1RL1a energizes two fan motors 148 (FIGS. 3 and 5) that are housed in the module package for the module 34a. Energization of motors 148 via contacts 1RL1a is through a current responsive element 150a that is physically incorporated in the circuit breaker 36a of the module 34a so that in response to excessive current through the element 150a the circuit breaker 36a is opened to disconnect the transformer 52a from the SCR controller 46. To this end, a normally open, temperature-responsive bimetal contact 152a is connected in series with a current limiting resistor 154a across the fan motors 148. Bimetal 152a is mounted directly on the heat sink for the diodes in the bridge rectifier 54a so that in response to excessive temperature at the diode the bimetal 152a closes to parallel resistor 154a with motors 148 causing the current through element 150a to increase to the point where it causes circuit breaker 36a to open. As previously indicated in connection with the description of FIG. 2, the contacts 2RL1a (FIG. 3, designated 94a in FIG. 2) are normally closed but in response to energization of relay RL1a contacts 2RL1a open so that resistor 90a is inserted in series with the current feedback from shunt 80 to decrease the feedback applied across the summing resistor 92. Similarly, should circuit breakers 36b or 36c open due to excessive current through the input to the respective primaries 114b, 114c, the corresponding contact 2RL1b or 2RL1c will close to short the corresponding resistor 90b or 90c to further increase the current feedback to the summing resistor 92. In this regard, it should be noted that each of the circuit breakers 36 includes at least two current responsive elements (not shown) each of which is connected in a different one of the input lines to the delta connected primary 114, i.e., in series with a respective line, so that the current sensing element opens the circuit breaker 36 in response to excessive current in any of the input phases to the transformer 52. Hence as indicated earlier, if the circuit breaker 36 is opened, either due to manual positioning of the circuit breaker or due to opening thereof in response to excessive current in the primary 114a, a corresponding resistor 90a will be shorted.

FIG. 3 also shows the specific construction of the wye-wye transformer 59 through which the SCR firing circuit 58 is energized. Transformer 59 is utilized to convert a three-wire input to a four-wire output with the fourth wire providing a false neutral in the SCR firing circuit 58. The use of the false neutral in the secondary of transformer 59 assures that all six SCR's 110, 111 in the controller 46 fire in the desired sequence independent of phase rotation of the three-phase source 40.

Referring now in greater detail to the circuit diagram for the voltage-current regulation circuit 62 illustrated in FIG. 4, the circuit 62 is energized by the input at lines 132, 133 (FIGS. 3 and 4) from the start-stop circuit 120 (FIG. 3). The alternating current input is rectified at 170 and the DC output from rectifier 170 is applied across a pair of potentiometers 172, 174 through a series regulator indicated generally at 176 to provide a stable reference voltage across the potentiometers 172, 174. Potentiometer 172 has a wiper 178 that serves as the current reference source (98, (FIG. 2), with wiper 178 being connected through resistor 100 to the summing point 102. The summing point 102 is also connected through the serially connected resistors 90a, 90b, 90c and via the line 180 to the output of the rectifier-filter circuit 88. As was previously noted, the current feedback signal from shunt 80 (through amplifier 82, chopper 84, amplifier 86 and rectifier and filter circuit 88, FIG. 1) is applied in bucking relationship to the reference signal from wiper 178. Hence it will be apparent that for a positive increase in the DC output current across shunt 80, the feedback signal applied across summing resistor 92 increases in a negative direction. The output signal developed across resistor 92 is applied to one-half of the "nor" gate circuit 72 which generally comprises a two-stage buffer amplifier formed by transistors 182, 183, the output of which drives the base of the transistor 184.

Similarly, the potentiometer 174 has a wiper 185 that serves as the voltage reference source (74, FIG. 2) to supply the voltage reference through resistor 76 to the summing point 70. The summing point 70 is also connected through the resistor 66 and a suitable filter 186 to the negative bus 48 via lead 188. For purposes of simplicity, filter 186 is omitted from FIG. 2 and it will be understood that filter 186 merely smooths the ripples in the DC output developed across busses 48, 50 as well as serving as a voltage divider to set the level of the voltage feedback to the summing point 70. As indicated earlier, the voltage feedback signal via resistor 66 bucks the reference voltage from wiper 185 so that an increase in the voltage across busses 48, 50 results in a negatively increasing signal being applied to the summing point 70. The output developed across resistor 68 is applied to the "nor" gate 72 through a buffer amplifier formed by two transistors 192, 193, the output of which drives the base of transistor 194. Transistors 184, 194 have a common emitter-resistor 196 that develops a differential output signal in a manner to be described in greater detail. The output across resistor 196 is fed through an operational amplifier 200 to the control input 60 of the SCR firing circuit 58. As previously indicated, the SCR firing circuit 58 may be of generally conventional construction. In response to a variation in the level of the output signal developed at input 60, corresponding equal shifts in the firing angle of all six SCR's 110, 111 is achieved. In the preferred embodiment, the SCR firing circuit was a "Vectrol full-wave phasetrol", Model No. VPH 1019-230/460-3X3, heretofore sold commercially by the Sprague Electric Co., North Adams, Mass. Amplifier 200 is primarily to match the output signal developed across resistor 196 with the firing circuit 58 so that the firing angle of the SCR's 110, 111 can be varied over substantially a full 175 degrees in response to the variations developed across output resistor 196.

The operation of the voltage-current regulation circuit 62 will be better understood assuming that there is initially no load on the six SCR's 110, 111 and that the voltage reference at wiper 185 is set to regulate the DC output voltage at busses 48, 50 to 12 volts. The reference voltage at wiper 185 is compared against the voltage feedback via line 188 which is initially zero at the summing point 70. Hence the positive reference causes the emitter-follower 192 to be forward biased and this drives transistor 194 into conduction. The transistor 194 is one-half of the "nor" gate 72 formed by transistors 184, 194. Transistor 194 develops an output signal across resistor 196 which is fed to amplifier 200 to in turn develop a DC control signal at 60 which drives the SCR firing circuit. The magnitude of the signal at 60 varies the effective width of the SCR gate pulses which, in turn, controls the SCR conduction angle. As the conduction angle of the six SCR's increases, the magnitude of the output voltage at 48, 50 will increase developing an increasing feedback voltage across the output 48, 50 and this in turn is fed back via resistor 66 and compared at resistor 68 against the voltage reference from 185. The voltage feedback is negative relative to the positive reference and hence when compared with the reference signal, the difference signal varies the base drive at transistor 194 to regulate the output at the constant 12 volts, regardless of line and load conditions. Regulation in a constant voltage mode continues until the amplified current feedback signal becomes large enough to turn transistor 184 on. In the absence of a load current or until the load current reaches a maximum value as determined by the setting of the current reference wiper 178, the base of transistor 184 is reverse biased and transistor 184 remains off. As a result, only voltage control is exercised by transistor 194. However, when the output current at busses 48, 50 has reached a value which is sufficiently large that the feedback from shunt 80 when compared with the current reference signal at wiper 178 turns transistor 184 on, conduction at transistor 184 turns transistor 194 off via the common emitter resistor 196 and cross-over from voltage control to current control occurs. Further increases in output current result in a greater negative feedback that interacts with the current reference signal at resistor 92 so that constant current is maintained. During constant current control, the voltage is free to fall. Stated differently, when cross-over from constant voltage control to constant current control occurs, the SCR's are phased back to a shorter duration conduction angle so that current through the load remains constant, even though more current is demanded. By the same token, when the device is in the constant voltage mode as opposed to constant current, if the load were constant and the line or the load were to change such that the voltage tried to increase, the voltage would be decreased.

As previously indicated, the current feedback is effected through resistors 90a, 90b, 90c, each of which is tied in with its respective module 34a, 34b, 34c; that is, the resistors 90a, 90b, 90c are arranged to be shorted by respective contacts 2RL1a, 2RL1b, 2RL1c so that the feedback level is inversely proportional to the number of operative modules. By way of further illustration, for a 21 module system, there will be 21 resistors in series with the current feedback and each resistor is shorted by a normally closed relay contact. When each module is energized by closing its associated circuit breaker 36, this, in turn, opens a normally closed relay contact 94, thereby inserting a resistor. As a result, the number of resistors that are active in the current feedback network represent the number of modules that are in operation. In the event that a module 34 becomes inoperative as a result of a failure mode or manual disconnect, this in turn reactivates a relay contact 94 to short out the resistor 90 that represents that module in the current feedback network. As a result, the current feedback signal is increased, thereby setting the automatic control to the point at which the full load current must be limited in order not to exceed the capability of the remaining modules active in the system. This system has particular merit in a system capable of $n$ modules 34 but where only ($2n/3$) modules 34 are installed in the system, which leaves ($n/3$) modules that are not operable at that time. The circuit breakers 36 for the associated ($n/3$) modules are left open. Using a normally closed relay contact to shunt a resistor prevents exceeding the current capability of the remaining ($2n/3$) modules that are in the system. When other of the ($n/3$) modules are added and activated by closing their circuit breakers, the contacts corresponding to contacts 94 are opened, thereby altering the current feedback signal and allowing the system to deliver the full current capability as reflected by the increased number of modules. The level of the current feedback will determine the maximum current output at busses 48, 50, even though the wiper 178 is set for a greater current than the active modules are capable of producing.

The mechanical construction of the power supply 30 together with the construction of the individual modules 34 is better illustrated in FIGS. 5–9 wherein a plurality of horizontally disposed U-shaped channels 210 are mounted on vertical uprights 212. Each of the modules 34 has a pair of bottom corner extrusions 214 having laterally outwardly projecting integral flanges 216 slideable on the top face of an associated channel 210. The flanges 216 and channels 210 extend the full length of the modules 34. Each of the bottom corner extrusions 214 are mounted on opposite ends of a pair of lower transformer brackets 217. Each bracket 217 has a downturned flange on its outer end that is fastened on an upstanding leg 218 of the corner 214 by one of the screws 220. Similarly, upper corner extrusions 230 are mounted on opposite ends of a pair of upper transformer brackets 232 by means of the upturned flanges on the ends of brackets that are fastened on downwardly depending legs 234 of the upper corner extrusions 230 by screws 220'. The laminations of the core 238 of the transformer 52 are securely bolted together between the upper transformer brackets 232 and the lower transformer brackets 217. The transformer primary winding 114 and secondary winding 116 are wound on core 238 in a generally conventional manner. Hence the transformer and its mounting brackets 217, 232 rigidly support the corner extrusions 214, 230, the lower corner extrusions 214 in turn providing a slideable mount on the channel 210 so that the modules 34 can slide outwardly from the frame members 212. The sides of the module 34 are each closed by a vertical side panel 240 which is fastened on the integral legs 218, 234 of the bottom and top corners 214, 230, respectively, by the four transformer mounting screws 220, 220' and four additional screws 242. A flat top panel 246 is removably carried in grooves on the upper corner extrusion 230 whereas a lower bottom panel 248 is removably carried in grooves on the bottom corner extrusions 214. Front and rear grills 250, 252, respectively, are mounted on opposite ends of the module 34 by screws threaded in the corner extrusions. The mounting screws 242 at the rear end of the modules 34, the right side as viewed in FIGS. 5 and 6, also support a fan bracket 254 that carries the two fan motors 148 (FIGS. 3–5) for each of the modules 34.

Figures 5, 6, 7, 9:
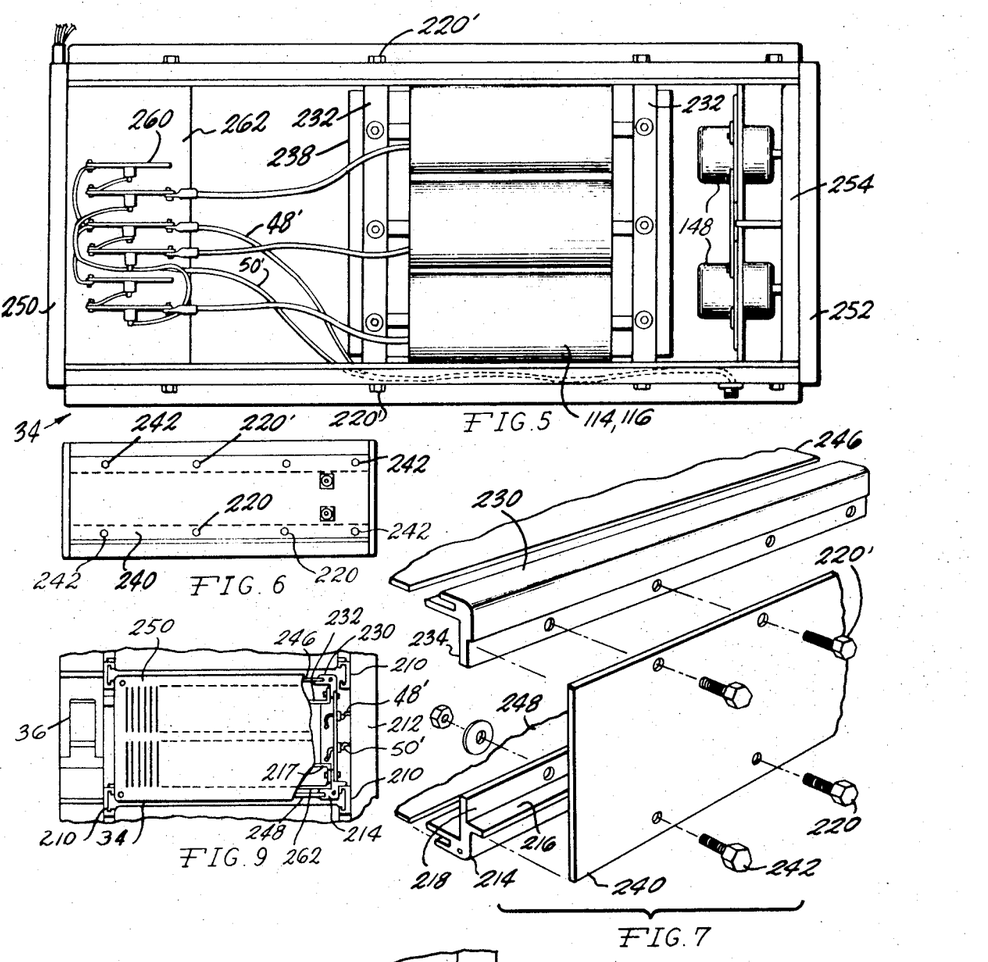
FIG. 5 is a top plan view of a single module used for high voltage applications.
FIG. 6 is a side view of the module illustrated in FIG. 5.
FIG. 7 is an exploded fragmentary view of one side of the module illustrated in FIG. 5.
FIG. 9 is an enlarged fragmentary view from FIG. 1 illustrating a single module and its associated circuit breaker.
Figure 8:
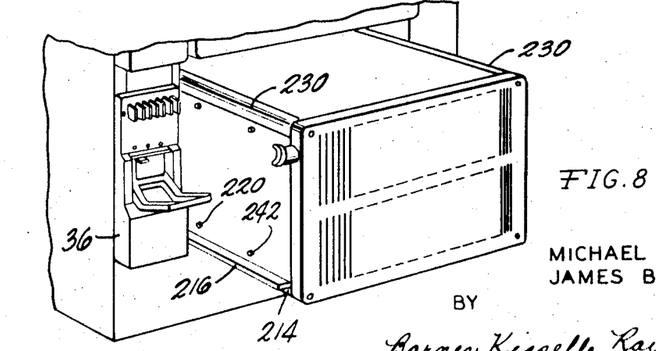
FIG. 8 is a fragmentary perspective view illustrating a complete module and its associated circuit breaker.

The six diode rectifiers and the rectifying circuit 54 are mounted on a suitable heat sink 260 which in turn is mounted on a heat sink bracket 262. Bracket 262 extends transversely of the module 34 and is fastened at opposite lateral sides thereof to the bottom corner 214 by the lower front screws 242. The positive bus 48' and the negative bus 50' connect the output of the rectifying circuit 54 to the main bus lines 48, 50 with the busses 48', 50' extending from the rectifying circuit 54 rearwardly through the module 34 and outwardly through one of the side panels 240 to suitable connectors at the rear of the modules where it is paralleled with the output from the other modules 34.

The particular construction of a single module described hereinabove has several important advantages. For purposes of illustration, the module 34 described in connection with FIG. 5 is for a high voltage rectifier system utilizing the heat sink construction 260 illustrated in FIG. 5. Similarly, the output in a high voltage rectifying system may be by conventional high tension bus leads 48', 50'. However, when the modular power supply 30 is constructed for low voltage systems, many of the same structural components can be used, namely, the corner extrusions 214, 230, the same top panel 246, the same bottom panel 248, the front and rear grills 250, 252 and the fan bracket 254 and fan motors 148. In general, the principal difference than between a high voltage and low voltage module merely involves a different mounting arrangement for a low voltage, high current heat sink and a slightly different transformer that is slightly larger but generally on the same order of dimensions as the transformer illustrated in FIG. 5 for the high voltage system. In the preferred embodiment of a low voltage system, the side panels 240 are modified so that the side panel serves not only as a structural component but also as a low voltage bus bar and, to some extent, serves to further conduct heat away from the low voltage heat sink.

It is also important that the various parts of each module are, to some extent, interchangeable. Hence the two bottom corners 214 have identical transverse cross sections and can be cut from the same extrusion. Similarly, the two upper corners 230 have identical transverse cross sections and are cut from the same extrusion. The top and bottom panels 246, 248 are identical and the four transformer brackets 217, 232 are identical. Although the front grill 250 is preferably of a different construction than the rear grill 252, the front grill on a high voltage power supply is interchangeable with the front grill on a low voltage power supply. Additionally, the modules 34 for either a high voltage application or a low voltage application have the same outside dimensions.

As noted hereinabove, the transformer brackets 232, 217 extend transversely substantially the full width of the module 34 and provide a main structural component giving rigidity to the module. Hence in the preferred embodiment, the transformer brackets 232, 217 are made of heavy gauge steel whereas the corners 214, 230 are extruded aluminum and the top, bottom and side panels are aluminum sheet metal. The grills 250, 252 are molded plastic. Hence the majority of the weight of an individual module is in the core 238 and the windings 114, 116. At least as important is the fact that each individual module 34 can be removed from the power supply 30 so that the modules can be handled, transported and installed individually to complete the assembly on site. This has numerous advantages over a bulky, heavy power supply providing the same kva output and contained in a single package. By way of example, a 24 volt module weighs approximately 234 pounds and a frame for 21 modules weighs approximately 2,500 pounds, whereas for a high voltage system at 300 volts utilizes modules each weighing 225 pounds with a 21 module frame weighing approximately 2,450 pounds.

The control circuitry described in connection with FIGS. 1-4 achieves effective control of plural modules made under close production tolerances to provide mechanical and electrical uniformity as between different modules. Similarly, the construction described hereinabove can provide mechanical and electrical symmetry in the different phases of an individual module. In this regard, the reactance of the transformer 52 is the most single important factor in determining how the current is shared as between parallel modules as well as between diodes within the rectifying circuit 54 of a given module. Hence variations due to differences between diodes and the rectifying circuits 54 are of secondary importance as compared to the transformer 52.

The horizontal air flow pattern through each of the individual modules also offers several distinct advantages, including a relatively large inlet at the front grill 250 for each individual module as well as a large combined total area for all of the modules when assembled in a bank such as the 21 module bank shown in FIG. 1. The cooling air is drawn by the fans located at the rear of the module so that the cool air first cools the heat sinks, such as the heat sink 260, and then the transformers before being exhausted at the rear of the module to grill 252. Again each of the individual grills on a single module offers a relatively large exhaust area as well as a combined exhaust area for the plurality of modules assembled in a bank. The flow from front to rear, as contrasted to vertical flow means that the cooling air is likely to be cleaner as contrasted to a system having an inlet at only a low level adjacent the floor. With a rear exhaust, it is not necessary to have a substantial clearance at the top of the power supply 30. Also with the large inlet and outlet areas for the cooling air, large quantities of air can be moved at a relatively low velocity, producing a much quieter operating system by comparison to prior art devices.

Other important advantages of the modular power supply described hereinabove are that a complete power supply can be built up from inventory modules to meet practically any power requirement by using the proper number of modules. A customer anticipating large future power requirements need not purchase the entire power supply to service those future requirements but by buying a large cabinet and using less than the maximum number of modules, the customer can meet present power requirements and than add additional modules as his demands increase. The system is very reliable in that extra modules may be kept on hand by the customer to eliminate down time in the event of a failure at one of the modules. The defective module is merely left in place and its circuit breaker opened while the circuit breaker on the spare module is closed. A self-adjusting voltage and current control with current limit override according to the number of modules in operation, and indeed the particular modules that are active, facilitate this flexibility and reliability of the modular power supply.

By way of further disclosure, the total capacity of the modular power supply 30 of the type described hereinabove is determined primarily by the ratings of the SCR's 110, 111 in the SCR controller. The ratings on air cooled SCR's presently available commercially are such that, in the preferred embodiment, the total kw output from the power supply 30 is on the order of 500 kw. After extensive development, it has been found that the above total kw output can be achieved while maintaining adequate safety ranges. Moreover, it has been found by extensive development that the above maximum output capabilities can be achieved most effectively by using 28 separate modules 34, for example, four vertical columns of seven modules per column. This particular arrangement provides a very compact power supply having a large ultimate power capability.

We claim:

1. An alternating-to-direct current converter for use in high power applications with a source of electrical energy, comprising controller means adapted to be coupled to the output of said source to vary the electrical energy delivered from said source to said converter in accordance with a main control signal, at least first and second rectifier means operatively coupled together to develop a common direct current output, first switch means operatively coupled to an input of said first rectifier means and to said controller means for selectively connecting and disconnecting said first rectifier means to and from said controller means, said first switch means being in a first state when said first rectifier means is connected to said controller means and in a second state when said first rectifier means is disconnected from said controller means, second switch means operatively coupled to an input of said second rectifier means and to said controller means for selectively connecting and disconnecting said second rectifier means to and from said controller means, said second switch means being in a first state when said second rectifier means is connected to said controller and in a second state when said second rectifier means is disconnected from said controller, and feedback means coupled to said common output and operative in a voltage control mode to vary said control signal in accordance with output voltage at said common output when output current at said common output is below a predetermined level and operative in a current control mode to vary said control signal in accordance with said output current when said output current is above said predetermined level, said feedback means comprising first circuit means operatively coupled to said common output so as to provide a voltage component control signal which varies in accordance with said output voltage, second circuit means operatively coupled to said common output so as to provide a current component control signal that varies in accordance with said output current, gate means having first and second inputs operatively connected to said first and second circuit means and responsive to said voltage component control signal to develop said main control signal during said voltage control mode and to said current component control signal to develop said main control signal during said current control mode, and selectively variable impedance means coupled in said feedback means and selectively operated in accordance with said states of at least one of said switch means to vary said current component control signal according to whether the rectifying means associated with said one switch means is connected or disconnected to said controller.

2. The converter as set forth in claim 1 wherein said selectively variable impedance means comprises first and second independently selectable impedance means each of which is associated with a respective one of said first and second switch means so that the state of said first switch means varies the impedance of said first impedance means and the state of said second switch means varies the impedance of said second impedance means to thereby vary said current component control signal according to the state of said first and said second switch means and thereby, in effect, vary said predetermined current level according to the number of rectifiers coupled to said controller means.

3. The converter set forth in claim 1 wherein said first circuit means includes voltage reference means and first comparison means responsive to said voltage reference and to said output voltage to develop said voltage component control signal in accordance with the difference therebetween, and wherein said second circuit means includes current reference means and second comparison means responsive to said current reference and to said output current to develop said current component control signal in accordance with the difference therebetween.

4. The converter set forth in claim 3 wherein said voltage reference means comprises a first manually variable impedance coupled in said first circuit means to establish a predetermined voltage level for said output voltage during said voltage control mode and wherein said current reference means comprises a second manually variable impedance to establish said predetermined current level during said current control mode.

5. The converter set forth in claim 3 wherein said selectively variable impedance means is connected in said feedback means between said common output and said second comparison means and comprises serially connected first and second independently selectable impedance means each of which is associated with a respective one of said first and second switch means so that the state of said first switch means varies the impedance of said first impedance means and the state of said second switch means varies the impedance of said second impedance means to thereby vary said current component control signal according to the state of said first and said second switch means and thereby, in effect, vary said predetermined current level according to the number of rectifiers coupled to said controller means.

6. The converter set forth in claim 1 wherein said first circuit means comprises first comparison means coupled to said common output and responsive to said output voltage and to a first reference to provide a first error signal representing the difference therebetween, said second circuit means comprises second comparison means coupled to said common output and responsive to said output current and to a second reference to develop a second error signal representing the difference therebetween, and wherein said gate means has its first and second inputs coupled to said first and second comparator means, respectively, and is responsive to said first and second error signals to provide said main control signal.

7. The converter set forth in claim 6 wherein said gate means comprises a nor gate arranged and constructed to respond to either one but not both of said error signals.

8. The converter set forth in claim 7 wherein said nor gate comprises first and second electronic switch means each of which has a pair of main electrodes defining a main current conducting path and a control input to control conduction through said main path, an impedance connected to one of said main electrodes of each of said electronic switch means so as to be common to the current conducting paths through both of said electronic switch means, said feedback means further comprises a direct current source, first and second variable impedance means coupled to said direct current source to provide said first and second references, and wherein said first comparison means further comprises a resistive summing network having a first input connected to said common output and a second input connected to said first variable impedance means, and said second comparison means further comprises a second resistive summing network having one input connected to said common output and another input connected to said second variable impedance means.

9. The converter set forth in claim 1 wherein said first and second switch means are circuit breaking means adapted for manual actuation, said selectively variable impedance means comprises a predetermined number of individual impedance means portions equal in number to the number of rectifier means in said converter, said selectively variable impedance means further comprises said predetermined number of contacts each of which is connected across a respective impedance means portion, each of said contacts further being responsive to the state of its associated circuit breaker means so as to selectively either insert or short its associated impedance means portion in response to the state of its associated circuit breaker means.

10. The converter set forth in claim 9 wherein said impedance means portions are connected to series with each other between said common output and one of said gate means inputs.

11. The converter set forth in claim 10 wherein said contacts are arranged and disposed so as to insert their associated impedance means portions in series between said common output and said one input of said second summing network when the switch means associated with said contacts are in their first state whereby when each rectifier means is coupled to said controller means by its associated switch means the associated contacts insert the associated impedance means portions between said common output and said second summing network.

12. An alternating-to-direct current converter for use in high power applications with a source of electrical energy, comprising controller means adapted to be coupled to the output of said source to vary the electrical energy delivered to said converter from said source in accordance with a main control signal, first rectifier means, first circuit breaker means adapted to be selectively actuated to connect and disconnect said first rectifier means with said controller means, second rectifier means, second circuit breaker means adapted to be selectively actuated to connect and disconnect said second rectifier means with said controller means, said first and second rectifier means being coupled together to develop a common direct current output across a pair of output bus lines, current sensing means connected in one of said lines, voltage sensing means connected across said bus lines, a first feedback means coupled to said current sensing means and adapted to develop a current feedback signal in accordance with current variations in said bus lines, second feedback means coupled to said voltage sensing means and adapted to provide a voltage feedback signal that varies in accordance with voltage variations across said bus lines, a first reference source to develop a current reference signal, a second reference source to develop a voltage reference signal, first comparison means coupled to said first feedback means and to said first reference source to develop a first error signal in accordance with said current feedback and reference signals, second comparison means coupled to said second feedback means and said second reference source to develop a second error signal in accordance with said voltage feedback and reference signals, gate means coupled to said first and second comparison means and responsive to said first error signal to develop said main control signal when output current at said common output is above a predetermined level and responsive to said second error signal to develop said main control signal when said output current is below said predetermined level, and selectively variable impedance means coupled to said first comparison means and selectively operated by said circuit breaker means to set said predetermined current level depending on the number of rectifier means connected to said controller means via their associated circuit breaker means.

13. The converter set forth in claim 12 wherein said selectively variable impedance means is connected in said first feedback means between said current sensing means and said first comparison means and comprises first and second independently selectable impedance means each of which is associated with a respective one of said first and second circuit breaker means so that the impedance of said first impedance means varies in accordance with whether its associated first circuit breaker means is actuated to connect said first rectifier means with said controller means and so that the impedance of the second impedance means varies in accordance with whether its associated second circuit breaker means is actuated to connect said second rectifier means with said controller means to thereby set said predetermined current level.

14. The converter set forth in claim 1 wherein said first and said second rectifier means each includes a respective transformer means having a respective primary winding and a respective secondary winding, said first switch means is connected between said controller means and said primary winding in said first rectifier means, and wherein said second switch means is connected between said controller means and said primary winding in said second rectifier means.

15. The converter set forth in claim 12 wherein said first and said second rectifier means each includes a respective transformer means having a respective primary winding and a respective secondary winding, said first circuit breaker means is connected between said controller means and said second primary winding in said first rectifier means, and wherein said second circuit breaker means is connected between said controller means and said primary winding in said second rectifier means.

* * * * *

UNITED STATES PATENT OFFICE
CERTIFICATE OF CORRECTION

Patent No. 3,746,967          Dated July 17, 1973

Inventor(s) MICHAEL A. KOLTUNIAK and JAMES B. RIGNEY

It is certified that error appears in the above-identified patent and that said Letters Patent are hereby corrected as shown below:

On the information cover page, column 1, delete lines 10-12 (designated with the numeral "[63]") and insert in place thereof --This is a continuation of application Serial No. 126,994, filed March 22, 1971, which in turn is a continuation of application Serial No. 9332, filed February 6, 1970 (both of which are now abandoned).--

Column 1, delete lines 2-5 and insert in place thereof --This is a continuation of application Serial No. 126,994, filed March 22, 1971, which in turn is a continuation of application Serial No. 9332, filed February 6, 1970 (both of which are now abandoned).--

Column 5, line 42, delete "(98, (Fig. 2)" and insert in place thereof --(98, Fig. 2)--. Column 8, line 66, "than" should be --then--. Column 13, line 9 (Claim 10), "to" should be --in--.

Signed and sealed this 16th day of April 1974.

(SEAL)
Attest:

EDWARD M.FLETCHER,JR.
Attesting Officer

C. MARSHALL DANN
Commissioner of Patents